United States Patent
Fishburn et al.

(10) Patent No.: US 12,506,358 B2
(45) Date of Patent: Dec. 23, 2025

(54) POWER EVENT IDENTIFICATION WITH DISTRIBUTED COMPUTING

(71) Applicant: Sense Labs, Inc., Cambridge, MA (US)

(72) Inventors: Matthew William Fishburn, Somerville, MA (US); George Zavaliagkos, Lexington, MA (US); Michael S. Phillips, Belmont, MA (US)

(73) Assignee: Sense Labs, Inc., Cambridge, MA (US)

( * ) Notice: Subject to any disclaimer, the term of this patent is extended or adjusted under 35 U.S.C. 154(b) by 410 days.

(21) Appl. No.: 18/320,785

(22) Filed: May 19, 2023

(65) Prior Publication Data

US 2024/0388128 A1  Nov. 21, 2024

(51) Int. Cl.
*H02J 13/00* (2006.01)
*G01R 19/25* (2006.01)
*G06F 1/30* (2006.01)

(52) U.S. Cl.
CPC .... *H02J 13/00002* (2020.01); *G01R 19/2506* (2013.01); *G01R 19/2513* (2013.01); *G06F 1/305* (2013.01)

(58) Field of Classification Search
CPC .......... H02J 13/00002; G01R 19/2506; G01R 19/2513; G06F 1/305
See application file for complete search history.

(56) References Cited

U.S. PATENT DOCUMENTS

| | | | |
|---|---|---|---|
| 9,443,195 B2 | 9/2016 | Micali et al. | |
| 10,878,343 B2 | 12/2020 | Choueiter et al. | |
| 11,146,868 B2 | 10/2021 | Petri et al. | |
| 2007/0059986 A1* | 3/2007 | Rockwell | G01R 31/52 340/10.41 |
| 2015/0074431 A1* | 3/2015 | Nguyen | G06F 1/30 713/300 |
| 2016/0033583 A1* | 2/2016 | Stanlake | G01R 31/58 324/764.01 |
| 2017/0356965 A1* | 12/2017 | Guzman-Casillas | G01R 31/42 |
| 2022/0050130 A1* | 2/2022 | Song | G01R 19/2513 |

FOREIGN PATENT DOCUMENTS

WO  WO-2017102488 A1 *  6/2017  .......... G01R 31/088

* cited by examiner

*Primary Examiner* — Mark A Connolly

(74) *Attorney, Agent, or Firm* — GTC Law Group PC & Affiliates

(57) ABSTRACT

Information about power events on the electrical grid may be determined by processing reports of power anomalies from power monitors installed at various points on the electrical grid, such as in buildings of end users of electrical power. A power monitor may process sensor measurements of the power line to determine that a power anomaly has occurred. The power monitor may transmit information about the power anomaly, such as the time and location, to a processing location. The processing location may select power anomaly reports having a similar time and location to determine information about a power event that caused the power anomalies. The information about the power event may include the type, time, and location of the power event. A notification may be sent about the power event to facilitate repairs and reduce risks, such as the risk of electrical fires.

22 Claims, 10 Drawing Sheets

| House ID | House Zip Code | Anomaly Time | Anomaly Type | Time Cluster | Anomaly Cluster |
|---|---|---|---|---|---|
| 10001 | 11111 | 10:01 AM | A13 | T1 | C1 |
| 10002 | 11112 | 10:01 AM | A13 | T1 | C1 |
| 10003 | 11112 | 10:02 AM | A4 | T1 | C2 |
| 10001 | 11111 | 10:01 AM | A13 | T1 | C1 |
| 20001 | 99991 | 10:01 AM | A7 | T1 | C3 |
| 20002 | 99992 | 10:13 AM | A9 | T2 | C4 |
| ... | | | | | |

Fig. 6

POWER EVENT IDENTIFICATION WITH DISTRIBUTED COMPUTING

BACKGROUND

A power company maintains an electrical grid for the generation of electrical power and the transmission of electrical power to end users, such as businesses and residential homes. The electrical grid may extend over long distances to provide electrical power to all the end users of the electrical company. Events may happen at different points along the electrical grid that may disrupt the transmission of electrical power to end users or create dangerous risks, such as the risk of a fire started by the electrical grid.

Events may be reported by end users, such as a report that a tree fell on an electrical line. Events may also be discovered by electrical company employees, such as employees who perform inspections of the electrical grid. An electrical company may, however, not receive timely notifications of some events, and the lack of timely notifications may cause deteriorated services (e.g., longer power outages) and increased risks, such as the risk of fire.

SUMMARY

In some aspects, the techniques described herein relate to a method, including: receiving a first power-anomaly report about a first power anomaly from a first power monitor wherein: the first power monitor is at a first building, and the first power-anomaly report includes (i) first location information about the first building and (ii) first time information about the first power anomaly; receiving a second power-anomaly report about a second power anomaly from a second power monitor wherein: the second power monitor is at a second building, and the second power-anomaly report includes (i) second location information about the second building and (ii) second time information about the second power anomaly; determining a first power-anomaly type for the first power anomaly by processing the first power-anomaly report with a classifier; determining a second power-anomaly type for the second power anomaly by processing the second power-anomaly report with the classifier; selecting a subset of power-anomaly reports from a plurality of power-anomaly reports using location information and time information, wherein the plurality of power-anomaly reports includes the first power-anomaly report and the second power-anomaly report; and determining a power-event type and a power-event location of a power event using the subset of power-anomaly reports.

In some aspects, the techniques described herein relate to a method, wherein the first location information includes one or more of an address, a zip code, an internet protocol address, or a media access control address.

In some aspects, the techniques described herein relate to a method, wherein determining the first power-anomaly type includes processing weather information with the classifier.

In some aspects, the techniques described herein relate to a method, wherein the first power-anomaly type is one or more of series high-impedance fault, series arc fault, parallel arc fault, parallel low-impedance fault, malformed power, or power loss.

In some aspects, the techniques described herein relate to a method, wherein the classifier includes a recurrent neural network or a transformer neural network.

In some aspects, the techniques described herein relate to a method, wherein the classifier includes a decision tree.

In some aspects, the techniques described herein relate to a method, wherein selecting the subset of power-anomaly reports includes selecting power anomalies using a time-difference threshold and a location-difference threshold.

In some aspects, the techniques described herein relate to a method, wherein selecting the subset of power-anomaly reports includes using a power-anomaly type.

In some aspects, the techniques described herein relate to a method, wherein the power-event type is one or more of malformed power from solar panels or a battery, malformed power from consuming device, malformed power from grid supply, power loss, parallel fault from vegetation, series fault from loose or corroded connection, or power theft.

In some aspects, the techniques described herein relate to a system, including at least one server computer including at least one processor and at least one memory, the at least one server computer configured to: receive a first power-anomaly report about a first power anomaly from a first power monitor wherein: the first power monitor is at a first building, and the first power-anomaly report includes (i) first location information about the first building and (ii) first time information about the first power anomaly; receive a second power-anomaly report about a second power anomaly from a second power monitor wherein: the second power monitor is at a second building, and the second power-anomaly report includes (i) second location information about the second building and (ii) second time information about the second power anomaly; determine a first power-anomaly type for the first power anomaly by processing the first power-anomaly report with a classifier; determine a second power-anomaly type for the second power anomaly by processing the second power-anomaly report with the classifier; select a subset of power-anomaly reports from a plurality of power-anomaly reports using location information and time information, wherein the plurality of power-anomaly reports includes the first power-anomaly report and the second power-anomaly report; and determine a power-event type and a power-event location of a power event using the subset of power-anomaly reports.

In some aspects, the techniques described herein relate to a system, wherein the subset of power-anomaly reports includes a power-anomaly report received from a distribution transformer or a substation.

In some aspects, the techniques described herein relate to a system, wherein the first power monitor is installed in a first electrical meter that measures power usage of the first building.

In some aspects, the techniques described herein relate to a system, wherein the first power monitor is installed in a first electrical panel of the first building.

In some aspects, the techniques described herein relate to a system, wherein the at least one server computer is configured to determine the first power-anomaly type by processing data from a temperature or humidity sensor.

In some aspects, the techniques described herein relate to a system, wherein the at least one server computer is configured to send a power-event notification.

In some aspects, the techniques described herein relate to a system, wherein the at least one server computer is configured to present, on a map, the first location information, the second location information, and the power-event location.

In some aspects, the techniques described herein relate to a system, wherein the at least one server computer is configured to determine the first power-anomaly type for the first power anomaly by processing information about a state change of a device in the first building.

In some aspects, the techniques described herein relate to one or more non-transitory, computer-readable media including computer executable instructions that, when executed, cause at least one processor to perform actions including: receiving a first power-anomaly report about a first power anomaly from a first power monitor wherein: the first power monitor is at a first building, and the first power-anomaly report includes (i) first location information about the first building and (ii) first time information about the first power anomaly; receiving a second power-anomaly report about a second power anomaly from a second power monitor wherein: the second power monitor is at a second building, and the second power-anomaly report includes (i) second location information about the second building and (ii) second time information about the second power anomaly; determining a first power-anomaly type for the first power anomaly by processing the first power-anomaly report with a classifier; determining a second power-anomaly type for the second power anomaly by processing the second power-anomaly report with the classifier; selecting a subset of power-anomaly reports from a plurality of power-anomaly reports using location information and time information, wherein the plurality of power-anomaly reports includes the first power-anomaly report and the second power-anomaly report; and determining a power-event type and a power-event location of a power event using the subset of power-anomaly reports.

In some aspects, the techniques described herein relate to one or more non-transitory, computer-readable media, wherein the power-event location corresponds to a location inside the first building.

In some aspects, the techniques described herein relate to one or more non-transitory, computer-readable media, wherein the power-event location corresponds to a vicinity of the first building and the second building.

In some aspects, the techniques described herein relate to one or more non-transitory, computer-readable media, wherein the first power-anomaly report includes current or voltage samples of an electrical sensor.

In some aspects, the techniques described herein relate to one or more non-transitory, computer-readable media, wherein the first time information includes one or more of a start time, an end time, or a duration of the first power anomaly.

BRIEF DESCRIPTION OF THE FIGURES

The invention and the following detailed description of certain embodiments thereof may be understood by reference to the following figures:

FIG. 6 is an example database table that may be used to store information about anomalies.

DETAILED DESCRIPTION

A power company may use distributed computing and machine learning to improve the detection and identification of power events along the electrical grid. Power sensors may be installed at various points along the electrical grid, such as at locations of end users of electrical power (e.g., in an electrical meter or an electrical panel). The locations are referred to as power monitoring locations. A power monitor location may perform processing, such as identification of anomalies in the electrical signal and/or transmit information about electrical signal to a processing location, such as a server computer. The processing location may receive information from the monitoring locations and process the information to determine any of whether a power event occurred, a type of a power event (e.g., tree fallen on power line), or a location of a power event.

Figure 1:
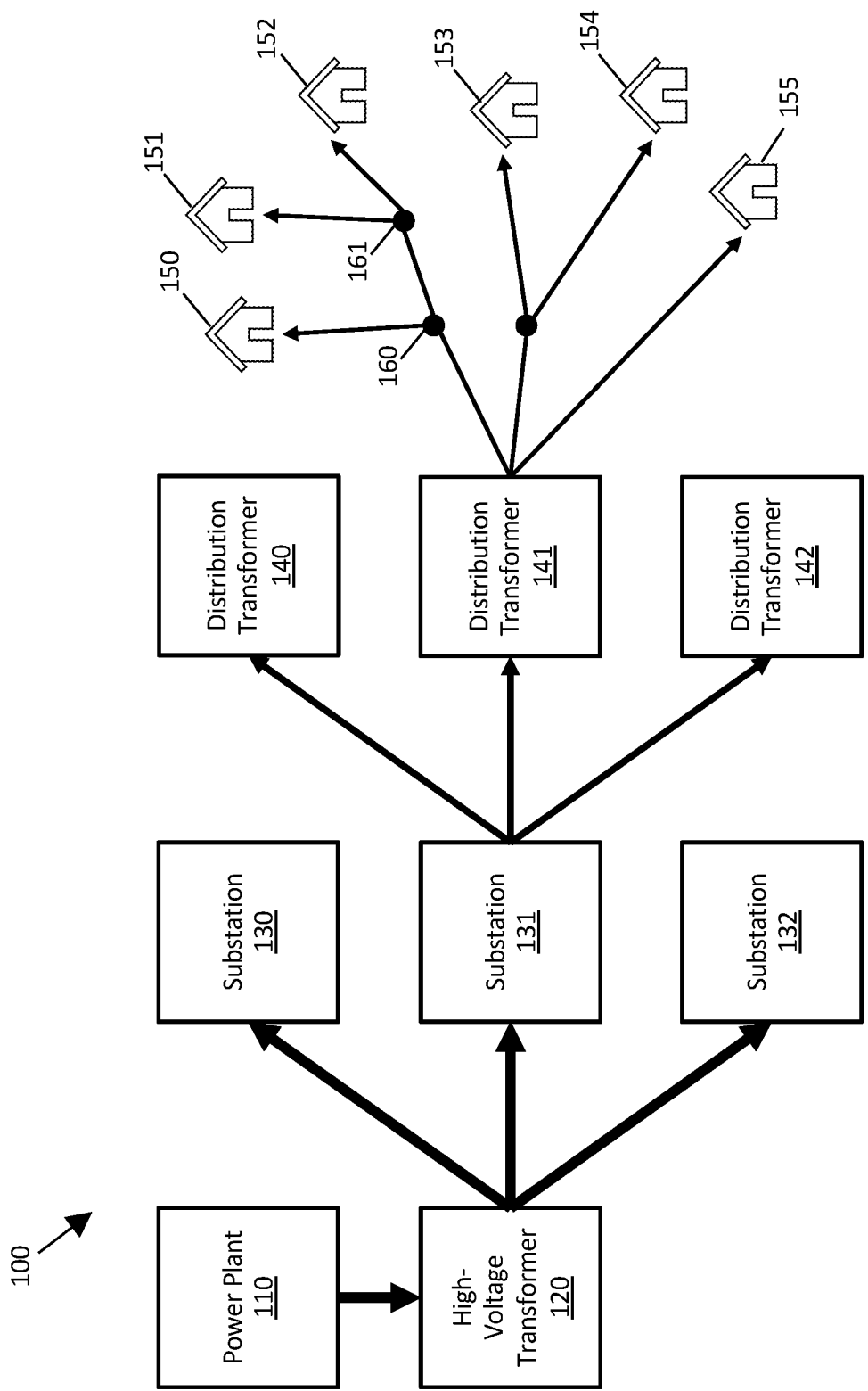
FIG. 1 is a representation of an example electrical grid.

FIG. 1 is a representation of an example electrical grid 100. The example of FIG. 1 is not limiting. Many variants of an electrical grid are possible, and the techniques described herein may be applied to any type of electrical grid, including different electrical transmission standards used in different countries.

In FIG. 1, power plant 110 generates electrical power. Any appropriate power generation techniques may be used, such as coal, natural gas, hydro, nuclear, wind, and/or solar.

High-voltage transformer 120 increases the voltage of the electrical power for transmission of the electrical power over long distances since higher voltage transmission increases efficiency and lowers costs.

High-voltage transformer 120 may transmit electrical power to one or more substations, such as substations 130-132. Each substation may provide power to a geographical area and may perform operations, such as transforming the voltage to a lower voltage.

Each substation may further transmit power to one or more distribution transformers, such as distribution transformers 140-142. Each distribution transformer may provide power to a subset of the geographical area served by the substation. A distribution transformer may perform operations, such as transforming the voltage to a lower voltage.

Each distribution transformer may further transmit power to one or more end users, such as end users 150-155. For clarity of presentation, the techniques described herein may use a "home" as an example end user, but the techniques may be applied to any type of end user, such as a condominium or a business.

The electrical path from a distribution transformer to an end user may be represented mathematically as a tree structure. For example, a single set of power lines (e.g., two mains and a neutral) may leave distribution transformer 141 to provide power to end users 150-152. The power distribution may then be split into two sets of power lines with a first set of power lines providing power to end user 150 and a second set of power lines providing power to end users 151 and 152. The point where the power lines split may be referred to as a point of common coupling, such as point of common coupling 160. Similarly, point of common coupling 161 may be used to split power lines to end user 151 and end user 152.

To monitor the performance of the electrical grid, electrical sensors may be installed in a variety of locations. For example, sensors may be installed at any of power plant 110, high-voltage transformer 120, substations 130-132, distribution transformers 140-142, and at end users 150-155. Any appropriate sensors may be used. For example, sensors may measure voltage and/or current levels. The measurements may be obtained using any appropriate sensors, and the techniques are not limited to any particular sensors or any particular types of values that may be obtained from sensors.

Power monitoring data from different sources may be transmitted to a processing location, such as a server computer or other computing resources. In some instances, raw sensor data may be transmitted, and in some instances, the power monitoring data may be processed sensor data and a result of the processing may be transmitted (e.g., a feature vector or the output of a classifier). Any appropriate network may be used to transmit the power monitoring data. For example, a power monitoring location may have a wired or wireless local area connection that allows power monitoring data to be transmitted over the Internet to the processing location. For another example, a power monitoring location may have a cellular or mobile network connection that may be used to transmit the power monitoring data to the processing location. In some implementations, a mesh network or a broadband-over-power-lines network may be used.

Figure 2:
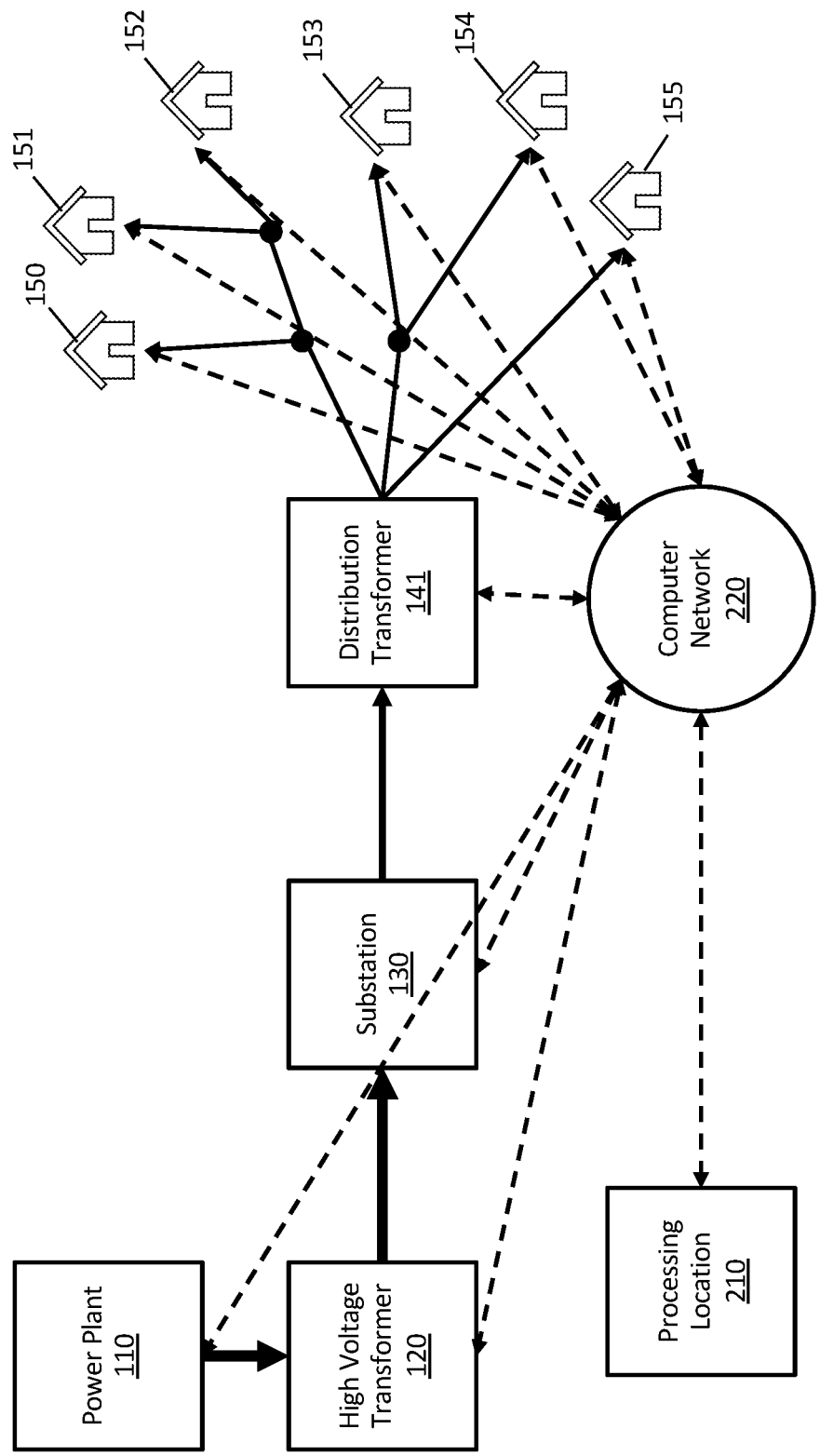
FIG. 2 is an example network architecture that may be used to transmit power monitoring data from power monitoring locations to a processing location.

FIG. 2 is an example network architecture that may be used to transmit power monitoring data from power monitoring locations to a processing location. In FIG. 2, a dotted line represents a transmission of data from one location to another location. Different power monitoring locations may use different kinds of networks. For example, end user 150 may transmit power monitoring data using a combination of a local W-Fi network and a cable modem to connect to the Internet, and distribution transformer 141 may have a cellular network connection.

In FIG. 2, computer network 220 may include any combination of network resources to transmit data from one location to another, such as any resources used by an Internet service provider or a cellular network provider. Processing location 210 may be in any appropriate location, such as a building owned by the power company or a cloud computing provider. Processing location 210 may have any appropriate resources for receiving power monitoring data over a network connection and processing the power monitoring data to determine information about power events. Processing location 210 may include, for example, one or more server computers.

Figure 3:
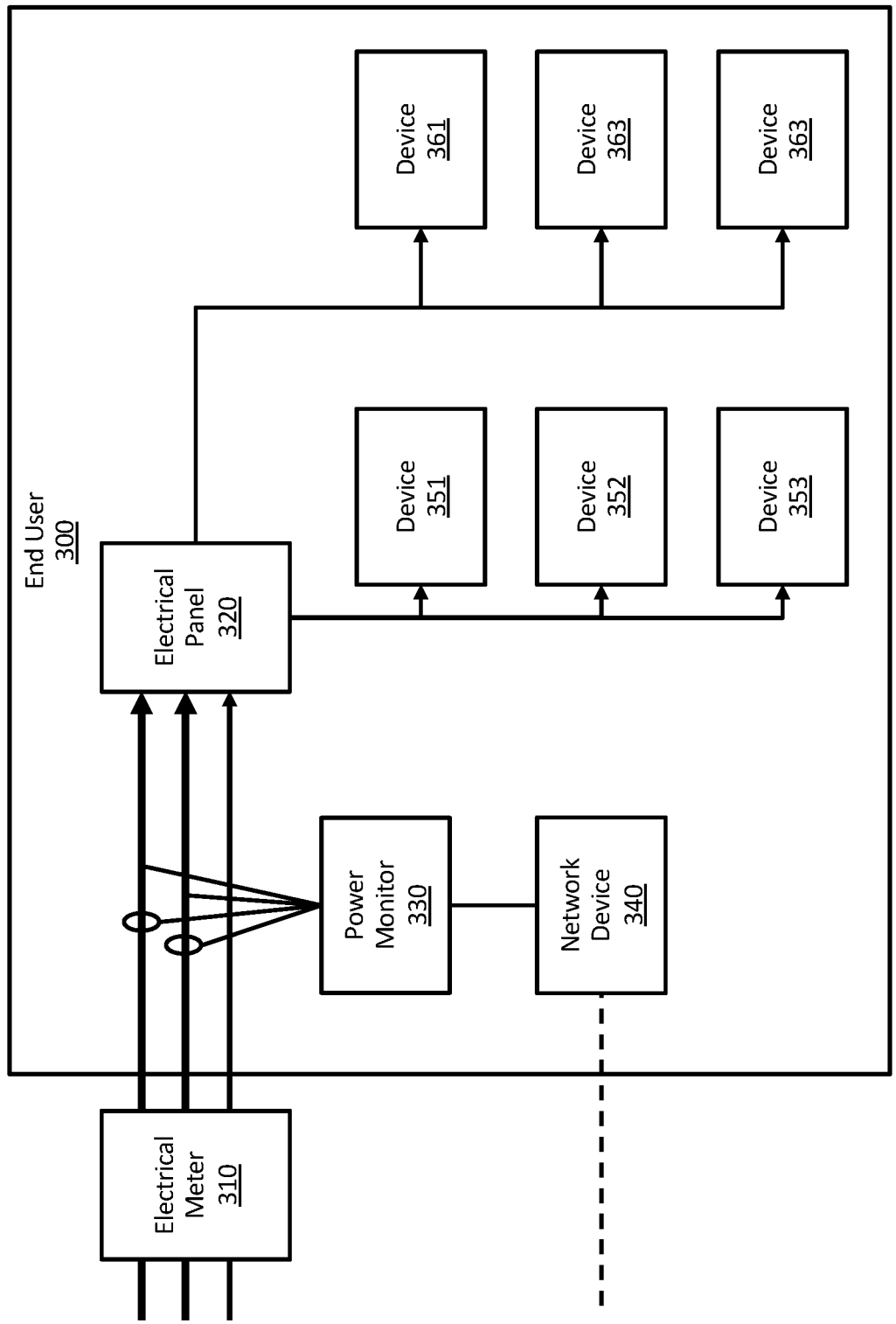
FIG. 3 is an example power monitoring location corresponding to an end user.

FIG. 3 is an example power monitoring location corresponding to an end user. For example, FIG. 3 may correspond to end user 150. End user 300 may correspond to any appropriate building, part of a building, or multiple buildings. For example, end user 300 may be the home of a residential end user of electrical power.

End user 300 may have an electrical meter 310 provided by the electric company to measure power usage of end user 300. In the example of FIG. 3, the electric service is shown as two electrical mains (thicker lines) and a neutral (thinner line) corresponding to typical split-phase power in the United States. The techniques described herein, however, may be used with any appropriate power system such as single-phase, two-phase, or three-phase power systems.

Electrical meter 310 provides power to electrical panel 320, which may correspond to any type of electrical panel. Electrical panel 320 may have multiple circuits and the circuits may connect to one or both of the power mains. Electrical panel 320 may distribute received power to multiple circuits for use by devices on those circuits. For example, a first circuit may provide power to devices 351-353 and a second circuit may provide power to devices 361-363.

End user 300 may have a power monitor 330 that measures electrical properties of the power provided to end user 300. For example, power monitor 330 may have current and/or voltage sensors attached any combination of the first main, the second main, and the neutral. Power monitor 330 may perform any appropriate processing of the sensor signals, such as any of the operations described in U.S. non-Provisional patent application Ser. No. 14/707,665 (now issued as U.S. Pat. No. 9,443,195) (SAGE-0002-U01), filed on May 8, 2015; U.S. non-Provisional patent application Ser. No. 16/912,013 (now issued as U.S. Pat. No. 11,146,868), filed on Jun. 25, 2020 (SAGE-0005-U01-C01); and U.S. non-Provisional patent application Ser. No. 16/179,567 (now issued as U.S. Pat. No. 10,878,343), filed Nov. 2, 2018 (SAGE-0006-U01); each of which are incorporated herein by reference in their entirety.

Power monitor 330 may perform anomaly detection and/or event detection as described herein. In some instances, power monitor 330 may be a device that is installed separately from electrical meter 310 and electrical panel 320. In some instances, power monitor 330 may be part of electrical meter 310 or may be part of electrical panel 320. Power monitor 330 may receive power directly from the power lines or may receive power from a circuit of electrical panel 320.

Power monitor 330 may have a connection with network device 340 for transmitting information to another location, such as processing location 210. Any appropriate network connection may be used. For example, power monitor 330 may have a Wi-Fi connection with network device 340, and network device 340 may be a cable modem that connects to the Internet. For another example, power monitor 330 may have a cellular connection and may not use network device 340.

Although not shown in FIG. 3, an end user 300 may have other electrical components. For example, end user 300 may have solar panels or a generator, and power monitor 330 may have additional sensors to measure electrical properties of the production of electricity by the solar panel or generator. For another example, end user 300 may have a home battery, and power monitor 330 may have sensors to measure the storage and discharge of power to the battery.

A power monitor may process the sensor signals of the power lines to look for anomalies that may occur in the power lines. The cause of anomaly may be inside a building of an end user or may be outside a building of an end user. For example, an anomaly may be caused by an arc fault, a fault with solar panels or a battery (e.g., a fault with the inverter), a fault with a device in a home, or a transformer failure. When an anomaly occurs, the power monitor may transmit a notification and/or other information to another location, such as a processing location.

Figure 4:
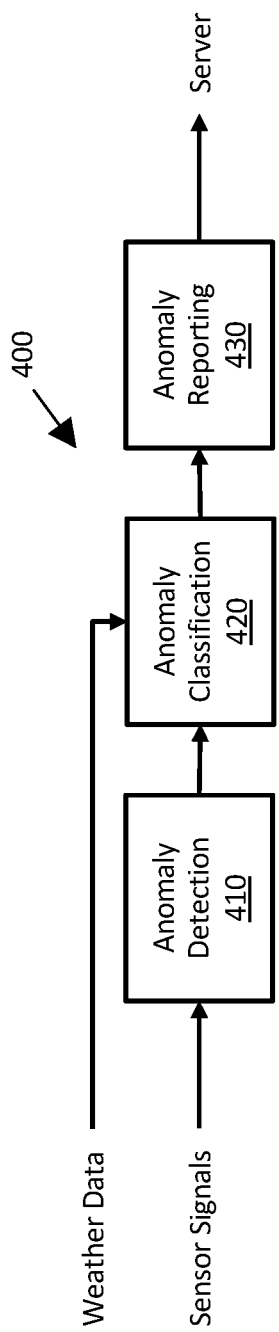
FIG. 4 is an example anomaly reporting system that may be implemented by a power monitor.

FIG. 4 is an example anomaly reporting system 400 that may be implemented by a power monitor.

In FIG. 4, anomaly detection component 410 may continuously process sensor signals, such as any combination of current and/or voltage sensor signals of the two mains and the neutral. Anomaly detection component 410 may process the sensor signals to determine whether an anomaly has occurred. In some implementations, anomaly detection component 410 may compute streaming digital samples of a power-monitoring signal, may compute a streaming sequence of feature vectors from the sensor signal, and process the feature vectors with an anomaly detector. For example, a detector may be implemented that outputs a detection score, and when the detection score exceeds a threshold, it may be determined that an anomaly has occurred.

Anomaly detection component 410 may also process other types of sensor signals, such as from local temperature or humidity sensors. The temperature or humidity near a power monitor may be different from local weather information where there are nearby events such as overheating, fire, water damage, or flooding, and these events may be indicative of the cause of a power anomaly.

Anomaly classification component 420 may also process the sensor signals (and/or the output of anomaly detection component 410, such as feature vectors) to determine a type of anomaly that has occurred. For example, a classifier may be implemented that outputs a vector of classification scores, where each classification score corresponds to a type of anomaly, and the type of anomaly may be determined as corresponding to the highest classification score. Anomaly classification component 420 may be configured to classify any appropriate power anomaly types, such as one or more of the following: series high-impedance fault, series arc fault, parallel arc fault, parallel low-impedance fault, malformed power, or power loss.

In some implementations, anomaly detection component 410 and anomaly classification component 420 may be combined into a single detection and classification component (where one of the classifications is that no anomaly has occurred) and in some implementations, they may be separate components as illustrated in FIG. 4.

Detection and classification may use information outside of the sensor signals to improve the accuracy of detections and classifications. For example, the current weather conditions may be an important factor in the determination of whether an anomaly has occurred and what type of anomaly occurred (e.g., high winds may make it more likely that an anomaly is caused by a tree falling on a power line). The weather data may include, for example, the current temperature, a recent daily low or high temperature, or an average temperature over a time period. Similar data may be obtained for wind speed, sunlight, humidity, rainfall, or snowfall.

For another example, information about the building may be an important factor in the determination of whether an anomaly has occurred and what type of anomaly occurred. The information about the building may include any appropriate information, such as the following: a type of the building (e.g., commercial, residential, apartment, or single-family home); square footage of the building, construction date of the building (e.g., may be indicative of the wiring of the building); the electrical service to the building (e.g., the number of amps); whether the building has solar panels, a battery, or a generator; and whether the power lines to the building are above ground or buried.

Anomaly detection component 410 and anomaly classification component 420 (or a combined version thereof) may be implemented using similar techniques, such as the following.

In some implementations, features may be computed from the sensor signals. For example, a feature may be computed for each 60 Hz power cycle, for a specified number of 60 Hz power cycles, or for a window of the sensor signal corresponding to a specified time (e.g., 1 second). Computed features may include any of the following: a number of cycles above or below a specified root-mean-square (RMS) voltage; a fraction of power within a band around the fundamental frequency or around other frequencies; total harmonic distortion; distortion factor; features computed by a recurrent neural network; or comparisons of waveforms (e.g., to capture asymmetry in waveforms).

In some implementations, features may include information about individual devices in the house that may be obtained by performing disaggregation techniques on the sensor signal, such as any of the techniques described in the patents incorporated by reference. For example, where a power anomaly frequently cooccurs with a state change of a device in the building, the power anomaly may be caused by the device in the building.

Features may be processed with any appropriate detector or classifier. For example, a detector or classifier may be implemented using any of the following: neural networks (e.g., recurrent neural networks, convolutional neural networks, graph neural networks, or transformer neural networks), self-organizing maps, support vector machines, decision trees, random forests, Gaussian mixture models, or gradient boosting. The detector or classifier may take any appropriate data as input, such as features computed from the sensor signals or weather data.

Anomaly reporting component 430 may receive the detection/classification results and determine whether and how the anomaly is to be reported. In some instances, information about the anomaly may be logged locally and may not be transmitted to any other locations. In some implementations, information about the anomaly may be transmitted to another location, such as a server computer at a processing location. The recipient of the anomaly reporting may be the end user, the electric company, or another recipient.

The report may include any appropriate information about the anomaly, such as one or more of the following: an identifier of the power monitor or end user (e.g., an Internet protocol address, a media access control address, or a unique identifier); samples of a sensor signal or power-monitoring signal; a time corresponding to the anomaly (e.g., a start time, end time, or duration); a location corresponding to the power monitor or the end users (e.g., a zip code or complete address); or a power-anomaly type.

A variety of factors may be used to decide whether and how an anomaly is to be reported. Anomaly reporting settings may be set by the end user, the electric company, or another entity. The settings may be based on desired privacy levels, the detection and/or classification scores (e.g., only report highly confident anomalies), or any other appropriate factors. In some instances, duplicate anomalies may not be reported. For example, where an anomaly is detected every minute for an hour, only the first anomaly may be reported. In some instances, anomalies may be reported for events that happen outside of the building of the end user (e.g., a tree fell on the power line) but may not be reported for events that happen inside the building of the end user (e.g., caused by an appliance in the building). In some instances, anomaly reporting settings may be based on available computer networks and/or bandwidth. For an Internet connection with higher bandwidth, more anomalies may be reported with more information about the anomaly (e.g., sensor waveform data). For a mesh network with lower bandwidth, fewer anomalies may be reported with less information about the anomaly (e.g., just that an anomaly occurred).

In some instances, anomaly reporting component 430 may receive requests for information and provide responses to those requests. A processing location may request that a particular power monitoring location provide information about anomalies or provide additional information about a previously reported anomaly.

In some implementations, anomaly reporting system 400 may be configured to determine that it is about to lose power or that it has lost its main source of power and is running on backup power. In such instances, anomaly reporting system 400 may be configured to store information relating to current or recent operation of the electrical grid, and to transmit information at a later date when power has been restored.

Anomaly reporting system 400 may use any appropriate techniques to determine that it is about to lose power. In some implementations, a separate detector or classifier may be used to predict an upcoming loss of power, and the detector or classifier may be implemented using any of the techniques described herein. In some implementations, the output of anomaly classification component 420 may indicate an upcoming loss of power. Where anomaly reporting system 400 has lost its main source of power, any appropriate backup power source may be used, such as a battery or a capacitor.

Anomaly reporting system 400 may store any appropriate information when it is determined that it is about to lose power or has lost power, such as any of the following: sensor signals of current or voltage, outputs of an anomaly detector, or outputs of an anomaly classifier. When power is restored, the stored information may be transmitted using any of the techniques described herein.

In some implementations, anomaly reporting system 400 may be broadened to report a greater variety of information, such as regular status updates or events that are not anomalies. For example, anomaly reporting system 400 may have one or more of an event detection component, an event classification component, or an event reporting component.

Figure 5A:
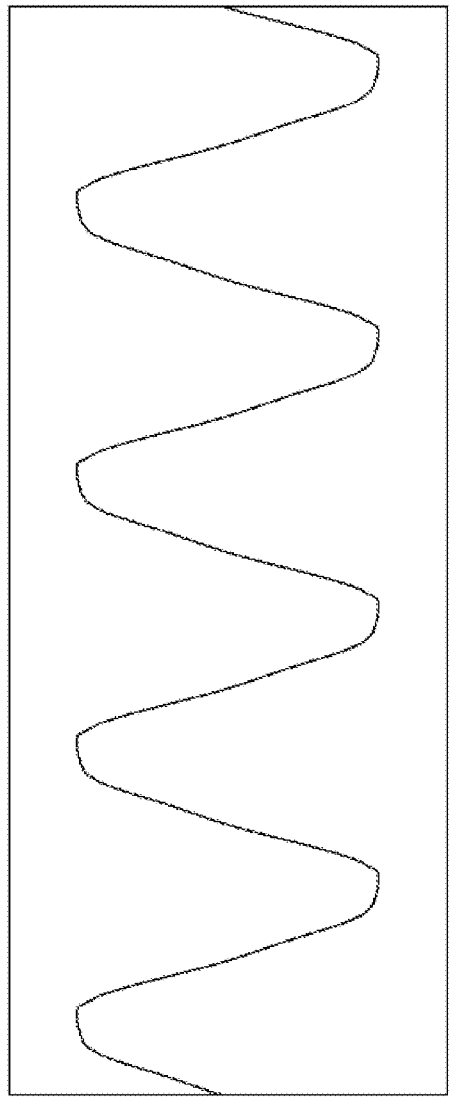
FIG. 5A is an example voltage waveform during expected operation of a power grid when no anomalies are present.
Figure 5B:
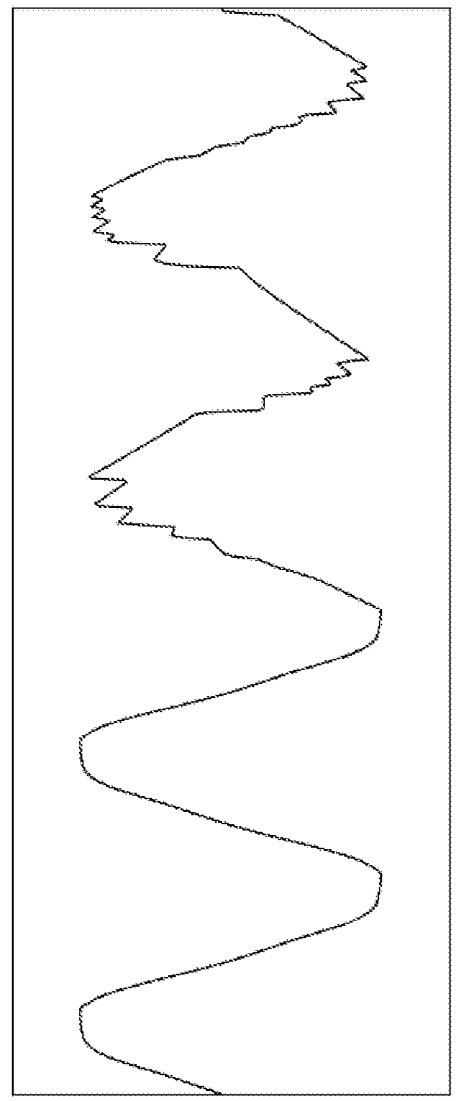
FIG. 5B is an example voltage waveform for an anomaly caused by a series arc fault in an electric panel's connection between the backplane and the main breaker.

FIGS. 5A-B are example waveforms that may be obtained from a sensor of a power monitor. FIG. 5A is an example voltage waveform during expected operation of a power grid when no anomalies are present. FIG. 5B is an example voltage waveform for an anomaly caused by a series arc fault in an electric panel's connection between the backplane and the main breaker. The anomaly of FIG. 5B may be detected by anomaly detection component 410, classified by anomaly classification component 420, and reported by anomaly reporting component 430.

A processing location may receive anomaly reports from many power monitoring locations over a variety of geographical extents, such as a county, state, or multiple states. In some instances, a processing location may be based in a state and receive anomaly reports from any power monitoring location in the state.

The processing location may store anomaly reports and process them to determine if a power event has occurred, a type of the power event, and a location of the power event. As used herein, a power event may refer to any type of event that may be of interest to an electric company or any other entity that provides products or services relating to the electrical grid. For example, power events may include any of the following events: equipment damaged from a fire or high temperature; transformer failure (possibly broken down into specific types of transformer failures, such as winding failure, tap changer failure, or cooling failure); vegetation arcing; wiring failure; grounding; energizing neutral; arc faults (e.g., serial and/or parallel); power theft; faulty power generation by solar panels; faulty power generation by batteries; faulty power generation by transformers; malformed power due to faulty or out-of-spec devices (e.g. a device is connected that is not configured to receive split-phase power).

A power-event type may be the same as an anomaly type or may be different. For example, an arc fault may be both an anomaly type and a power-event type. In some instances, a power-event type may be broader than an anomaly type (e.g., more than one anomaly type may correspond to the same event type). In some instances, an anomaly type may be broader than a power-event type (e.g., more than one power-event type may correspond to the same anomaly type).

A processing location may store anomaly information in a database. FIG. 6 is an example database table that may be used to store information about anomalies. The database table may store any appropriate information about anomalies, such as the following: an identifier of the end user or power monitor that reported the anomaly; location information about the end user or power monitor that reported the anomaly (e.g., a zip code); a time corresponding to the anomaly; a type of the anomaly (e.g., as determined by the power monitor that reported the anomaly or as determined at the processing location); a time cluster identifier; or an anomaly cluster identifier.

The determination of whether a power event occurred, the type of power event, and the location of the power event may be improved by processing anomalies identified at multiple power monitoring locations. For example, suppose a tree falls on a power line between distribution transformer 141 and common coupling 160. In this situation, it may be expected that an anomaly would occur at end users 150-152 but would not occur at end users 153-155. Conversely, by processing received power anomalies from multiple end users, a location (or approximate location) of a power event may be determined.

To identify power events, the stored anomalies may be clustered or grouped according to various criteria, such as anomaly time, anomaly location, or anomaly type.

For some power events, it may be likely that multiple power monitoring locations experience an anomaly at a similar time. To more efficiently and more quickly identify power events, the anomalies may be assigned to one or more time clusters. Including a time cluster identifier in a database may improve the efficiencies of retrieving and processing events. Any appropriate techniques may be used to assign one or more time clusters. For example, a time cluster may be created whenever a threshold number of anomalies occur within a time threshold (e.g., more than 3 anomalies in less than 5 minutes). For another example, a cluster may be all anomalies that occur within a time period, such as creating a cluster for each minute interval (e.g., a first cluster for anomalies occurring between 1:01:00 PM and 1:01:59 PM and a second cluster for anomalies occurring between 1:02:00 PM and 1:02:59 PM).

For some power events, it may be likely that multiple power monitoring locations experience an anomaly in a geographic area. Where a tree falls on a power line, all end users receiving power via that power line may experience an anomaly, and those end users are likely close to each other geographically.

Anomalies may also be clustered to an anomaly type. Where two anomalies occur at a similar time in a similar location, but have different anomaly types, it may be likely that the two anomalies are unrelated to each other and that they occurred by coincidence at a similar time and location.

Accordingly, one or more cluster identifiers may be stored with the anomalies to facilitate processing of the anomalies. For the example of FIG. 6, a time cluster is stored for each anomaly so that anomalies from similar times are in the same cluster. Additionally an overall anomaly cluster is stored for anomalies that are in the same time cluster, occurred in a similar geographical location, and have the same anomaly type.

Compute resources may process data from an anomaly database to determine whether a power event occurred, a type of the power event, and/or a location of the power event.

Figure 7:
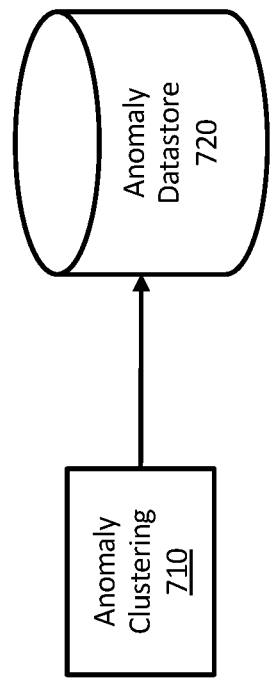
FIG. 7 is an example system for clustering anomaly data.

FIG. 7 is an example system 700 for clustering anomaly data. System 700 may be implemented using any appropriate compute resources, such as on-premise compute resources and/or compute resources provided by a third party.

In FIG. 7, anomaly clustering component 710 may perform clustering of anomalies using any of the techniques described herein. Anomaly data store 720 may store information about anomalies both before and after clustering. In some implementations, a first anomaly data store may store information about unclustered anomalies and a second anomaly data store may store information about clustered anomalies.

Anomaly clustering component 710 may perform clustering of anomalies using any appropriate techniques, such as any of the techniques described herein. The clustering may be performed on any appropriate time intervals. For example, clustering may be performed at regular time intervals, such as every minute or hour, or may be performed after a number of unclustered anomalies exceeds a threshold. Clustering may be performed in response to (and/or in anticipation/preparation of) one or more events and/or a sequence of events.

Anomaly clustering component 710 may cluster based on any appropriate criteria, such as one or more of location, time, or anomaly type. A time-difference threshold may be used to cluster anomalies in time, and a location-difference threshold may be used to cluster anomalies by location. Anomaly clustering component 710 may retrieve anomalies from anomaly data store 720, perform clustering on those anomalies, and then write clustered anomaly information back to anomaly data store 720.

Figure 8:
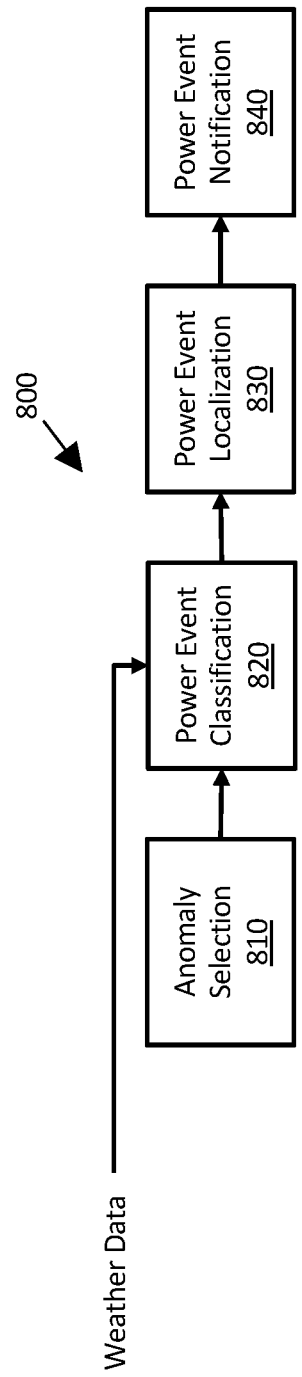
FIG. 8 is an example system for processing anomaly data to determine one or more of whether a power event occurred, a type of the power event, and/or a location of the power event.

FIG. 8 is an example system 800 for processing anomaly data to determine one or more of whether a power event occurred, a type of the power event, and/or a location of the power event. System 800 may be implemented using any appropriate compute resources, such as on-premise compute resources and/or compute resources provided by a third party.

In FIG. 8, anomaly selection component 810 may select a subset of anomalies for processing. The selection of anomalies by anomaly selection component 810 may be performed at any appropriate intervals, such as the intervals described above for anomaly clustering component 710. In some implementations, anomaly selection component 810 may also perform clustering operations, and in some implementations, anomaly selection component 810 select previously clustered anomalies.

Any appropriate subset of anomalies may be selected. A subset of anomalies may be referred to as a cluster or a group of anomalies. In some implementations, each anomaly will be part of a cluster and some clusters may consist of a single anomaly. In some implementations, only some anomalies will be part of a cluster or only clusters that meet specified criteria may be further processed (e.g., clusters containing a minimum number of anomalies). In some implementations, a cluster of anomalies may include anomalies that are within a specified time and within a specified distance from each other. In some implementations, a cluster of anomalies may include anomalies that are within a specified time, within a specified distance, and having the same anomaly type or a similar anomaly type. Each subset of selected anomalies may then be further processed.

Power event classification component 820 may receive information about a subset of anomalies from anomaly selection component 810 and process the information to determine a power-event type corresponding to the subset of anomalies. Any appropriate power-event type may be determined, such as one or more of the following: malformed power from solar panels or a battery, malformed power from consuming device, malformed power from grid supply, power loss, parallel fault from vegetation, series fault from loose or corroded connection, or power theft. Power event classification component 820 may use any appropriate techniques to determine a power-event type corresponding to the subset of anomalies.

Power event classification component 820 may process any appropriate data relating to the subset of anomalies, including but not limited to the following: waveform data from a power monitoring location (e.g., current and/or voltage waveforms from any of the power monitoring locations in FIG. 1); anomaly types (e.g., as determined at a power monitoring location or determined at the processing location); information from nearby power monitoring locations that did not report an anomaly (e.g., waveform data or a number that did or did not report anomalies); weather data (e.g., any of the weather data described herein). In some implementations, one or more feature vectors may be created from the foregoing, and the feature vectors may be processed by a classifier to determine the power-event type.

In some implementations, the processing location may send requests to power monitoring locations for additional data. For example, where a power monitoring location reported an anomaly and provided some data, the processing location may request that the power monitoring location provide additional data (e.g., higher resolution waveform data). For another example, the processing location may request data from power monitoring locations that did not report an anomaly but are geographically close to a power monitoring location that did report an anomaly.

Power event classification component 820 may use any appropriate classification techniques, such as any of the classification techniques described herein for anomaly classification. In some implementations, power event classification component 820 may compute a vector of scores, likelihoods, or probabilities, where each element of the vector corresponds to a power-event type. The power-event type may be selected as corresponding to the largest value of the vector. For example, the vector may be the output of a softmax layer of a neural network.

Power event localization component 830 receives information about a subset of anomalies and processes the information to determine a location corresponding to a power event. The processing of power event classification component 820 and power event localization component 830 may be performed in any order or may be performed in parallel. Power event localization component 830 may use the output of power event classification component 820 or vice versa.

The determined location of a power event may be specified using any appropriate techniques. In some implementations, the location may be specified geographically, such as being within a specified distance of one or more power monitoring locations or in the vicinity of one or more power monitoring locations (e.g., a circle encompassing one or more power monitoring locations). In some implementations, the location may be specified electrically as corresponding to a portion of the electrical grid. For example, it may be determined that the power event occurred between distribution transformer 141 and common coupling 160 of FIG. 1. In some implementations, the location may be probabilistic, with a probability of occurring in geographic and/or electrical locations. In some instances, it may be determined that the location is inside a building corresponding to a power monitoring location (e.g., caused by a faulty appliance in the building).

Power event localization component 830 may use any appropriate techniques to determine a location of a power event. The determination of the location may use the power-event type and/or the anomaly types. In some implementations, the location may be determined using one or more of the following: neural networks (e.g., recurrent neural networks, convolutional neural networks, graph neural networks, or transformer neural networks), self-organizing maps, support vector machines, decision trees, random forests, Gaussian mixture models, or gradient boosting.

Information about a power event, such as type, location, and time, may be stored in any appropriate location, such as a power event data store.

Power-event notification component 840 may receive information about the power-event type and/or power-event location and determine whether to issue a notification and how to issue a notification. For example, where the power event does not have any associated risks and the power event may be fixed by routine maintenance, no notification may be issued. For another example, where it is determined that the power event occurred inside the building of an end user, a notification may be sent to the end user (e.g., via mail, electronic mail, or notification in an application, such as a smart-phone application). For another example, where it is determined that the notification occurred at a location on the power grid outside the buildings of end users, a notification may be sent to appropriate personnel of electric company to take action.

In some implementations, notifications may be presented on a map. For example, a web application or other application may present a map of a portion of the service area. Markers may be placed at power monitoring locations that are reporting an anomaly, and/or markers may be placed at locations of power events. The markers may be presented using any appropriate techniques, such as color coded corresponding to different event types and sizes corresponding to a severity of an event.

Figure 9:
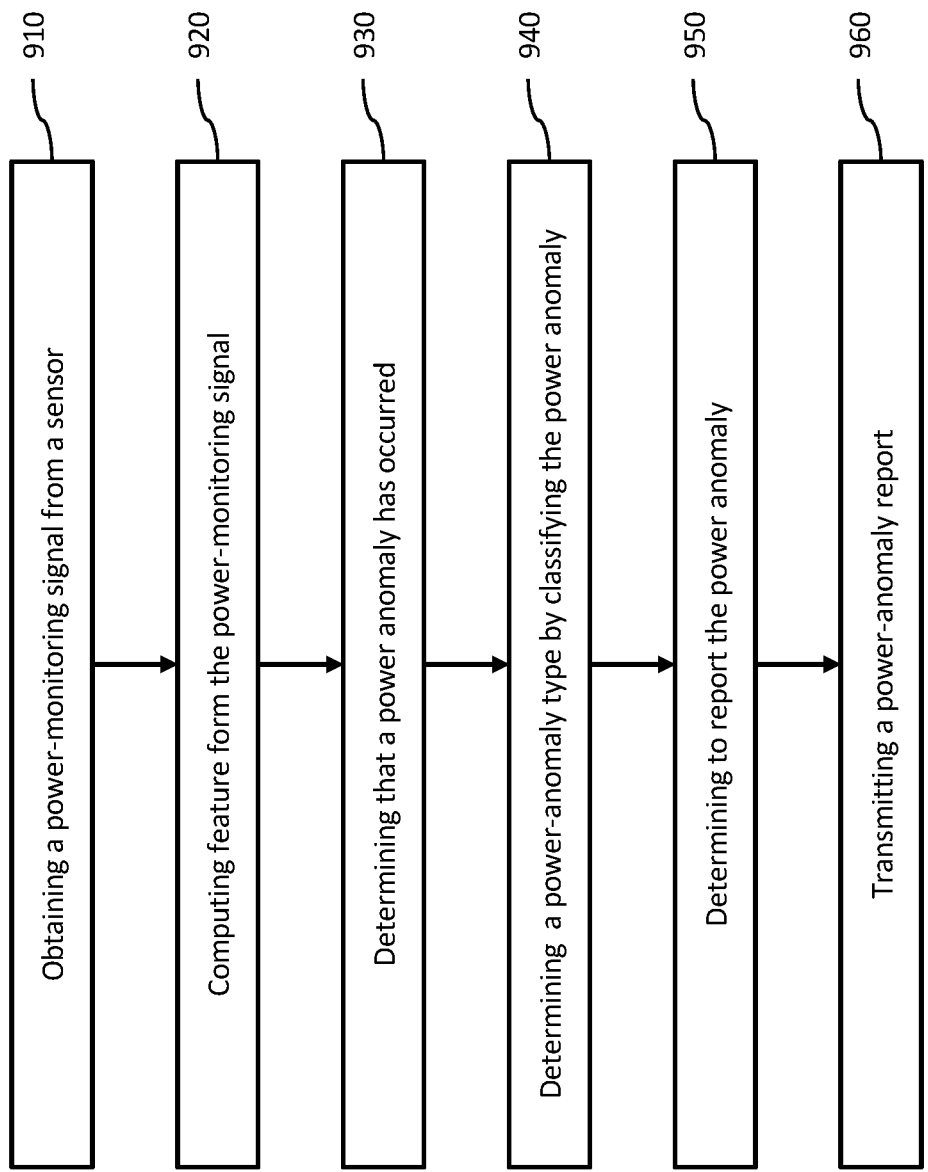
FIG. 9 is a flowchart of an example method for performing anomaly detection and reporting.

FIG. 9 is a flowchart of an example method for performing anomaly detection and reporting. FIG. 9 may be performed by any appropriate device, such as a power monitor at a power monitoring location (e.g., a building of an end user, a distribution transformer, or a substation).

At step 910, a power-monitoring signal is obtained from a sensor that measures an electrical property of a power line. The power-monitoring signal may be obtained using any appropriate techniques, measure any appropriate electrical property (e.g., current or voltage), and may be obtained using any appropriate sensor. The power-monitoring signal may be streamed in real time or near real time.

At step 920, features are computed from the power-monitoring signal. Any appropriate features may be computed, such as any of the features described herein. Feature vectors may be streamed in real time or near real time. In some implementations, feature vectors may not be computed or may be computed at a later point (e.g., for power anomaly classification).

At step 930, it is determined that a power anomaly occurred. Any appropriate techniques may be used to determine that a power anomaly has occurred, such as any of the techniques described herein. In some implementations, the power-monitoring signal or feature vectors computed from the power-monitoring signal may be processed by an anomaly detector to compute a detection score that indicates a probability or likelihood that an anomaly has occurred.

At step 940, a power-anomaly type corresponding to the power anomaly is determined. Any appropriate techniques may be used to determine the type of a power anomaly, such as any of the techniques described herein. In some implementations, the power-monitoring signal or feature vectors computed by the power-monitoring signal may be processed by an anomaly classifier to compute classification scores that indicates a probability or likelihood for different anomaly types.

In some implementations, steps 930 and 940 may be combined into a single step that both determines that an anomaly has occurred and the type of the anomaly. For example, a classifier may be used where one of the outputs of the classifier corresponds to no anomaly is present.

At step 950, it is determined to report the power anomaly. Any appropriate techniques may be used to determine whether to report the anomaly and where and how to report the anomaly, such as any of the techniques described herein.

At step 960, a power anomaly report is transmitted. Any appropriate techniques may be used to transmit the power-anomaly report, such as any of the techniques described herein.

Figure 10:
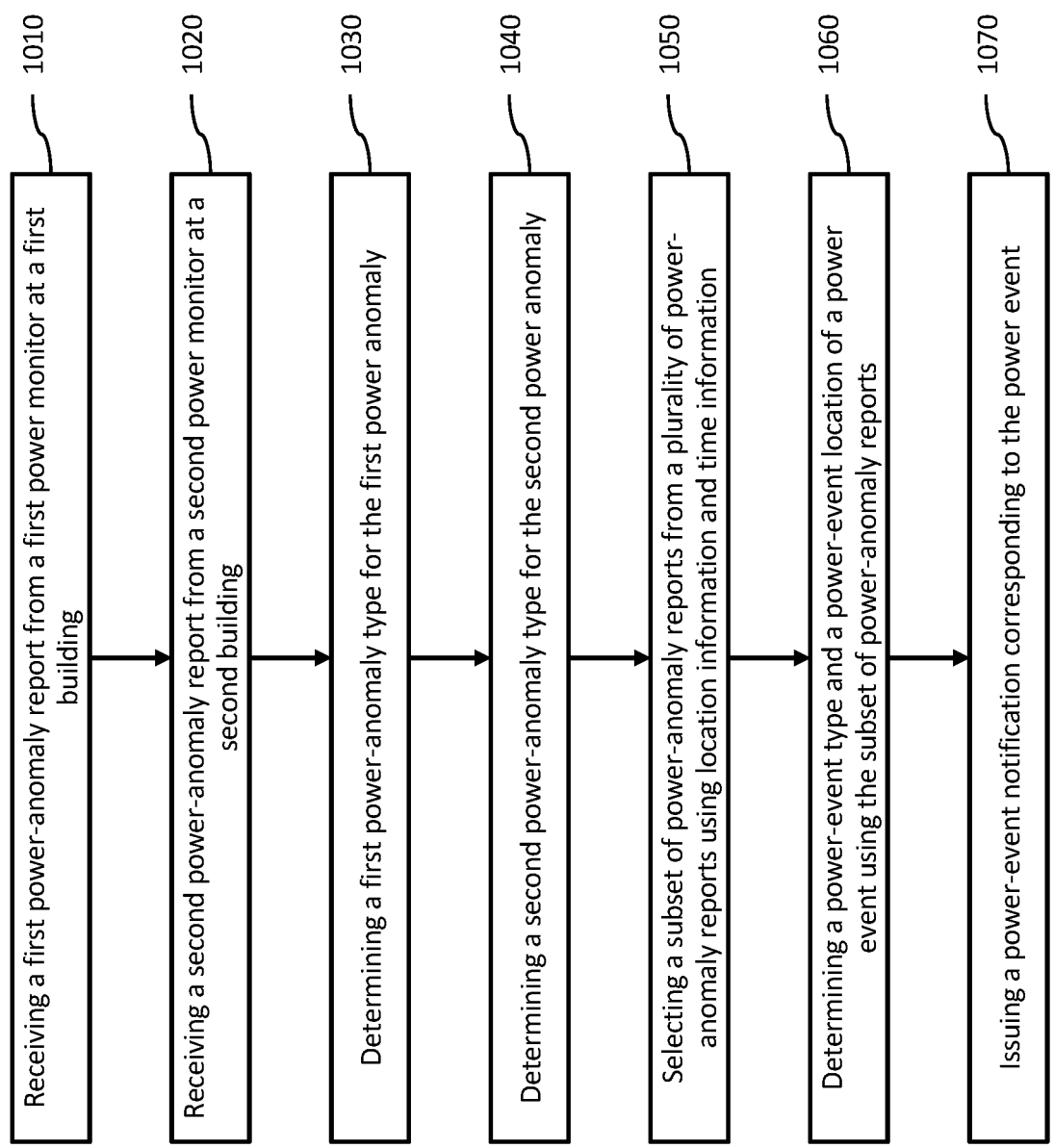
FIG. 10 is a flowchart of an example method for processing power-anomaly reports to determine a type and location of a power event corresponding to the power anomaly reports.

FIG. 10 is a flowchart of an example method for processing power-anomaly reports to determine a type and location of a power event corresponding to the power anomaly reports.

At step 1010, a first power-anomaly report is received from a first power monitor at a first building. The first power-anomaly report may include any appropriate information about the first power anomaly, such as first location information corresponding to the first building, first time information corresponding to first power anomaly, a first power anomaly type of the first power anomaly, and any other power anomaly information described herein.

At step 1020, a second power-anomaly report is received from a second power monitor at a second building. This step may be performed as described in step 1010.

At step 1030, a first power-anomaly type is determined for the first power anomaly by processing the first power-anomaly information with a classifier. The step may be performed at a power monitoring location and transmitted to a processing location (e.g., in a power anomaly report) or may be performed at a processing location. In some implementations, a power monitoring location may determine an initial power anomaly type, and a processing location may compute a revised power anomaly type (e.g., with greater computational resources or data).

At step 1040, a second power-anomaly type is determined for the second power anomaly by processing the second power-anomaly information with a classifier. This step may be performed as described in step 1030.

The above steps may additionally be performed for any number of power anomaly reports from any number of locations. For example, a third power-anomaly report may be received from a third power monitor at a third building, and a third power-anomaly type may be determined for the third power anomaly. Power anomaly reports may be received from any appropriate location, such as any of the locations in FIG. 1.

At step 1050, a subset of power-anomaly reports is selected from available power-anomaly reports. The available power power-anomaly reports may include the first and second power-anomaly reports. Any appropriate techniques may be used to select the subset of power-anomaly reports, such as any of the techniques described herein. In some implementations, power anomalies may be clustered, and the subset may correspond to a cluster. In some implementations, the subset may correspond to power anomalies with any of a similar location, similar time, and/or power anomaly type.

At step 1060, a power-event type and/or a power-event location is determined for a power event corresponding to subset of power-anomaly reports. Any appropriate techniques may be used to determine the power-event type and/or a power-event location, such as any of the techniques described herein.

At step 1070, a power-event notification is issued corresponding to the power event. The power-event notification may be issued using any appropriate techniques, such as any of the techniques described herein.

Figure 11:
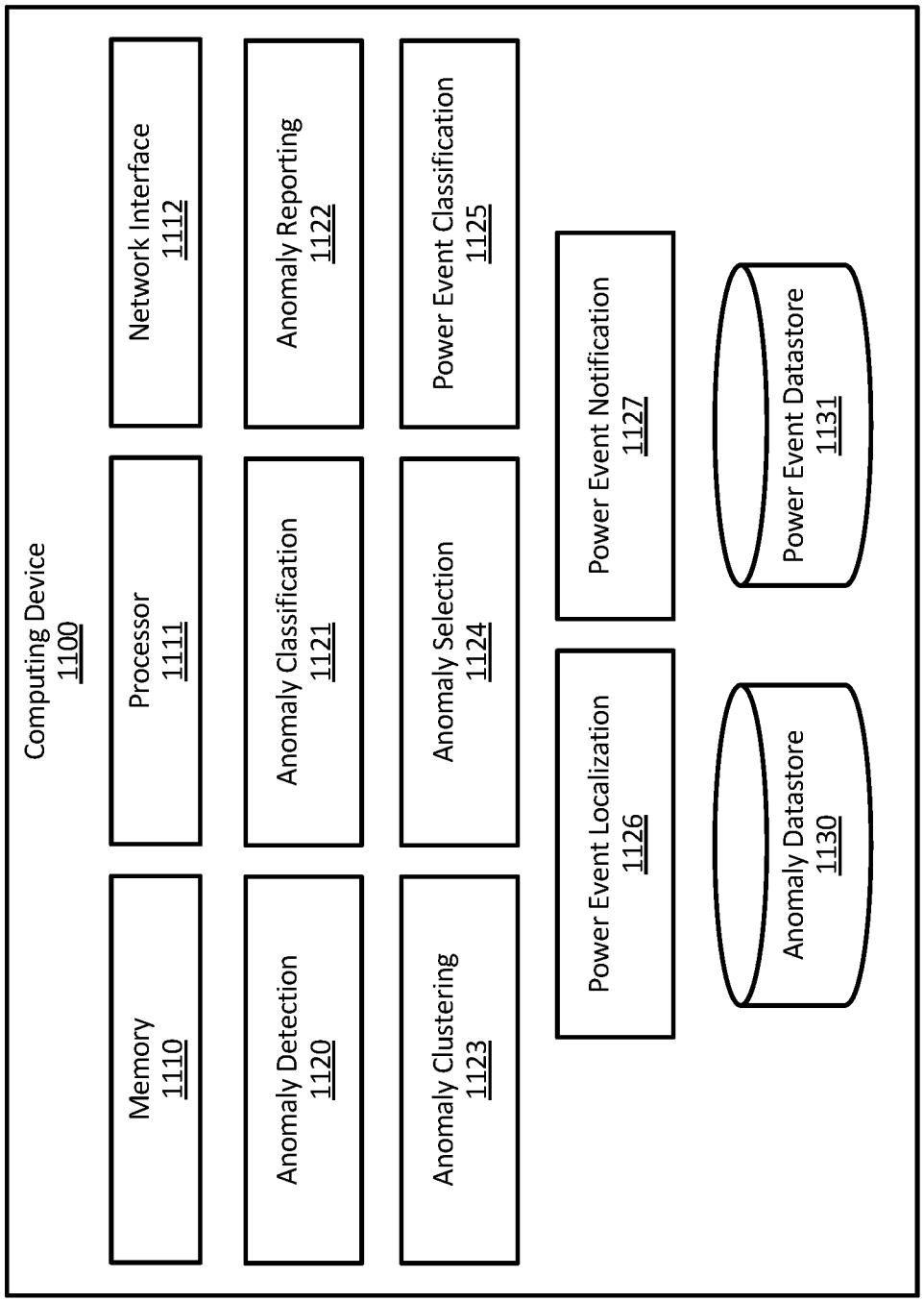
FIG. 11 illustrates components of one implementation of a computing device for implementing any of the techniques described herein.

FIG. 11 illustrates components of one implementation of a computing device 1100 for implementing any of the techniques described herein. In FIG. 11, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1100 may include any components typical of a computing device, such as volatile or nonvolatile memory 1110, one or more processors 1111, and one or more network interfaces 1112. Computing device 1100 may also include any input and output components, such as displays, keyboards, and touch screens. Computing device 1100 may also include a variety of components or modules providing specific functionality, and these components or modules may be implemented in software, hardware, or a combination thereof. Computing device 1100 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 1100 may have an anomaly detection component 1120 that may detect power anomalies using any of the techniques described herein. Computing device 1100 may have an anomaly classification component 1121 that may classify a power anomaly into a power-anomaly type using any of the techniques described herein. Computing device 1100 may have an anomaly reporting component 1122 that may report power anomalies using any of the techniques described herein. Computing device 1100 may have an anomaly clustering component 1123 that may cluster power anomalies using any of the techniques described herein. Computing device 1100 may have an anomaly selection component 1124 that may select one or more power anomalies using any of the techniques described herein. Computing device 1100 may have a power event classification component 1125 that may classify a power event into a power-event type using any of the techniques described herein. Computing device 1100 may have a power event localization component 1126 that may determine a location corresponding to a power event using any of the techniques described herein. Computing device 1100 may have a power event notification component 1127 that may provide a notification regarding a power event using any of the techniques described herein.

Computing device 1100 may include or have access to various data stores. Data stores may use any known storage technology such as files, relational databases, non-relational databases, or any non-transitory computer-readable media. Computing device 1100 may have anomaly data store 1130 that stores information about reported power anomalies. Computing device 1100 may have a power event data store 1131 that stores information about power events.

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general-purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

All documents referenced herein are hereby incorporated by reference.

What is claimed is:

1. A method, comprising:
    receiving a first power-anomaly report about a first power anomaly from a first power monitor, wherein:
        the first power monitor is at a first building, and
        the first power-anomaly report includes (i) first location information about the first building and (ii) first time information about the first power anomaly;
    receiving a second power-anomaly report about a second power anomaly from a second power monitor, wherein:
        the second power monitor is at a second building, and
        the second power-anomaly report includes (i) second location information about the second building and (ii) second time information about the second power anomaly;
    determining a first power-anomaly type for the first power anomaly by processing the first power-anomaly report with a classifier;
    determining a second power-anomaly type for the second power anomaly by processing the second power-anomaly report with the classifier;
    selecting a subset of power-anomaly reports from a plurality of power-anomaly reports using location information and time information, wherein the plurality of power-anomaly reports includes the first power-anomaly report and the second power-anomaly report; and
    determining a power-event type and a power-event location of a power event using the subset of power-anomaly reports.

2. The method of claim 1, wherein the first location information comprises one or more of an address, a zip code, an internet protocol address, or a media access control address.

3. The method of claim 1, wherein determining the first power-anomaly type comprises processing weather information with the classifier.

4. The method of claim 1, wherein the first power-anomaly type is one or more of a series high-impedance fault, a series arc fault, a parallel arc fault, a parallel low-impedance fault, malformed power, or power loss.

5. The method of claim 1, wherein the classifier comprises a recurrent neural network or a transformer neural network.

6. The method of claim 1, wherein the classifier comprises a decision tree.

7. The method of claim 1, wherein selecting the subset of power-anomaly reports comprises selecting power anomalies using a time-difference threshold and a location-difference threshold.

8. The method of claim 1, wherein selecting the subset of power-anomaly reports comprises using a power-anomaly type.

9. The method of claim 1, wherein the power-event type is one or more of malformed power from solar panels or a battery, malformed power from a consuming device, malformed power from grid supply, power loss, a parallel fault from vegetation, a series fault from a loose or corroded connection, or power theft.

10. A system, comprising at least one server computer comprising at least one processor and at least one memory, the at least one server computer configured to:
    receive a first power-anomaly report about a first power anomaly from a first power monitor, wherein:
        the first power monitor is at a first building, and
        the first power-anomaly report includes (i) first location information about the first building and (ii) first time information about the first power anomaly;
    receive a second power-anomaly report about a second power anomaly from a second power monitor, wherein:
        the second power monitor is at a second building, and
        the second power-anomaly report includes (i) second location information about the second building and (ii) second time information about the second power anomaly;
    determine a first power-anomaly type for the first power anomaly by processing the first power-anomaly report with a classifier;
    determine a second power-anomaly type for the second power anomaly by processing the second power-anomaly report with the classifier;
    select a subset of power-anomaly reports from a plurality of power-anomaly reports using location information and time information, wherein the plurality of power-anomaly reports includes the first power-anomaly report and the second power-anomaly report; and
    determine a power-event type and a power-event location of a power event using the subset of power-anomaly reports.

11. The system of claim 10, wherein the subset of power-anomaly reports includes a power-anomaly report received from a distribution transformer or a substation.

12. The system of claim 10, wherein the first power monitor is installed in a first electrical meter that measures power usage of the first building.

13. The system of claim 10, wherein the first power monitor is installed in a first electrical panel of the first building.

14. The system of claim 10, wherein the at least one server computer is configured to determine the first power-anomaly type by processing data from a temperature sensor and/or a humidity sensor.

15. The system of claim 10, wherein the at least one server computer is configured to send a power-event notification.

16. The system of claim 10, wherein the at least one server computer is configured to present, on a map, the first location information, the second location information, and the power-event location.

17. The system of claim 10, wherein the at least one server computer is configured to determine the first power-anomaly type for the first power anomaly by processing information about a state change of a device in the first building.

18. One or more non-transitory, computer-readable media comprising computer executable instructions that, when executed, cause at least one processor to perform actions comprising:

receiving a first power-anomaly report about a first power anomaly from a first power monitor, wherein:
  the first power monitor is at a first building, and
  the first power-anomaly report includes (i) first location information about the first building and (ii) first time information about the first power anomaly;
receiving a second power-anomaly report about a second power anomaly from a second power monitor, wherein:
  the second power monitor is at a second building, and
  the second power-anomaly report includes (i) second location information about the second building and (ii) second time information about the second power anomaly;
determining a first power-anomaly type for the first power anomaly by processing the first power-anomaly report with a classifier;
determining a second power-anomaly type for the second power anomaly by processing the second power-anomaly report with the classifier;
selecting a subset of power-anomaly reports from a plurality of power-anomaly reports using location information and time information, wherein the plurality of power-anomaly reports includes the first power-anomaly report and the second power-anomaly report; and
determining a power-event type and a power-event location of a power event using the subset of power-anomaly reports.

19. The one or more non-transitory, computer-readable media of claim 18, wherein the power-event location corresponds to a location inside the first building.

20. The one or more non-transitory, computer-readable media of claim 18, wherein the power-event location corresponds to a vicinity of the first building and the second building.

21. The one or more non-transitory, computer-readable media of claim 18, wherein the first power-anomaly report comprises current samples or voltage samples of an electrical sensor.

22. The one or more non-transitory, computer-readable media of claim 18, wherein the first time information comprises one or more of a start time, an end time, or a duration of the first power anomaly.

* * * * *